Jan. 17, 1967 T. C. WEATHERS ETAL 3,298,583

TAPE TRANSPORT THREADING MECHANISM HAVING MOVABLE PRESSURE ROLLER

Filed Aug. 24, 1964 3 Sheets-Sheet 1

INVENTORS
THOMAS C. WEATHERS &
HAROLD R. JENSEN
BY Eugene M. Whitacre
Attorney

Jan. 17, 1967 T. C. WEATHERS ETAL 3,298,583
TAPE TRANSPORT THREADING MECHANISM
HAVING MOVABLE PRESSURE ROLLER
Filed Aug. 24, 1964 3 Sheets-Sheet 2

INVENTORS
THOMAS C. WEATHERS &
HAROLD R. JENSON
BY
Eugene M. Whitacre
Attorney

TAPE TRANSPORT THREADING MECHANISM
HAVING MOVABLE PRESSURE ROLLER

Filed Aug. 24, 1964

INVENTORS
THOMAS C. WEATHERS &
HAROLD R. JENSON
BY
Eugene M. Whitacre
Attorney

United States Patent Office 3,298,583
Patented Jan. 17, 1967

3,298,583

TAPE TRANSPORT THREADING MECHANISM HAVING MOVABLE PRESSURE ROLLER

Thomas C. Weathers and Harold Jensen, Indianapolis, Ind., assignors to Radio Corporation of America, a corporation of Delaware Filed Aug. 24, 1964, Ser. No. 391,642
8 Claims. (Cl. 226—90)

The present invention relates to magnetic recording and reproducing apparatus and more particularly to a transport mechanism for a reelable magnetic record.

A practical tape transport mechanism desirably has simple means for inserting, accepting, and guiding the tape medium into the drive mechanism for accurately aligning the tape with the pickup device to permit reliable recording and reproduction of the recorded signal. This is even more desirable in cases where a plurality of channels are recorded on a single tape medium as found in stereophonic tape records with reversible recording channels. A slight misalignment in the tape will result in driving only a portion of the recorded channel past the reproducing device resulting in degraded operation. Misalignment is especially undesirable in the use of cartridge-type tape records that require automatic aligning of the cartridge with tape guides as the cartridge is placed on the transport mechanism and put into operation.

It is therefore an object of this invention to provide an improved apparatus for aligning a tape in a tape transport mechanism.

It is also an object of this invention to provide an improved low-cost mechanism for automatically seating a tape in the tape transport guide mechanism.

It is still a further object of the present invention to provide an improved apparatus providing a wide clearance for accepting a cartridge type recorded tape into a tape transport mechanism that also automatically seats the tape into the tape transport guide mechanism.

The invention comprises resiliently mounting a rotatable pressure roller in a tape transport mechanism that includes a rotatable capstan that cooperates with the pressure roller for driving the tape through a tape guide mechanism. The pressure roller is resiliently tilted away from the capstan while the transport mechanism is in the tape load position thereby providing a wider gap for the insertion of the tape. When switched to the play position, the pressure roller is forced against the capstan against the resilient tilting force of its mounting means whereby the pressure roller aligns itself with the drive surface of the capstan. In the aligning process, a force is exerted by the pressure roller on the tape, urging the tape downwardly into the tape guide slots thereby accurately positioning the tape in relation to the recorder pickup heads.

The invention itself, both as to its organization and method of operation, as well as the foregoing and other objects and advantages thereof, will become more readily apparent from a reading of the following description when read in connection with the accompanying drawings, in which.

Figure 1:
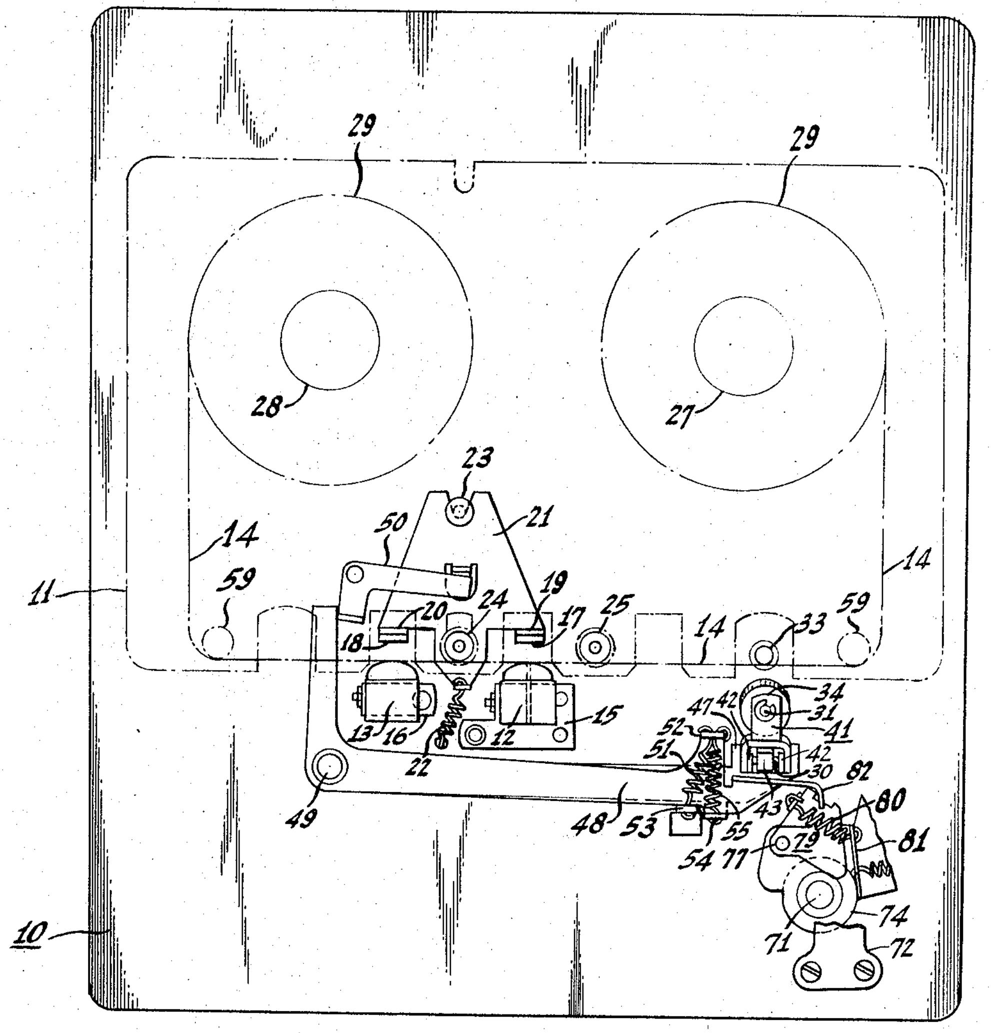
FIGURE 1 is a plan view of a transport mechanism in accordance with the invention with certain parts removed and other parts broken away.
Figure 2:
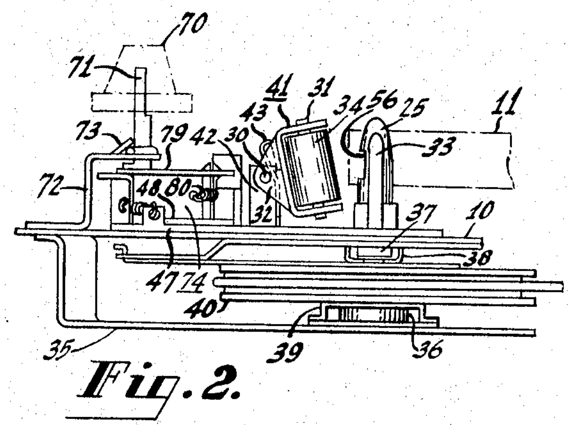
FIGURE 2 is a side view of a portion of the tape transport of the pressure roller-capstan drive mechanism of FIGURE 1.

Referring to FIGURES 1 and 2 of the drawings, there is shown a tape deck 10 on which a cartridge 11 may be disposed. The cartridge 11 carries a magnetic record tape 14 which is driven by the tape transport mechanism. The cartridge 11 is shown in phantom in the drawing. Cartridges of the type illustrated are generally available and may have a plurality of record tracks recorded on the tape therein. These record tracks are adapted to be scanned by magnetic heads 12 and 13. The head 12 is a record-playback head. The head 13 is an erase head. Each of these heads 12 and 13 may have a pair of spaced head units for simultaneously scanning a pair of record tracks. Stereophonic or monoaural recording or reproducing is therefore possible. The tape deck 10 and its driving mechanism is employed in the Radio Corporation of America Tape Transport 1961, Models TCT–3 and 3A modified by the addition of a spring clip 43 hereinafter described.

The heads 12 and 13 are mounted on the tape deck 10 by means of brackets 15 and 16. The pressure pads 17 and 18 cooperate with heads 12 and 13, respectively. These pressure pads are disposed on studs 19 and 20 which project out of the deck (as shown in the plan view of FIGURE 1) from a slide plate 21 which is slidably mounted on the tape deck 10. The tape 14 is pressed against the heads when the slide plate 21 moves in a direction towards the heads (towards the bottom of the drawing as viewed in FIGURE 1) under the bias of a spring 22 which is connected between the tape deck 10 and another upwardly projecting stud on the slide plate 21. The slide plate 21 is guided by a lug 23 which projects from the tape deck 10 through a slot in the slide plate 21 and by a tape guide 24 which also projects from the deck 10 through another slot in the slide plate 21. Another tape guide 25 is provided on the opposite side of the head 12. The pair of tape guides 24 and 25 are secured to the tape deck for the purpose of positioning the cartridge at the proper position on the deck and so that the tape 14 will be properly aligned with the heads. The tape cartridge includes a pair of hubs 29 (shown in phantom) around which the tape is wound. These hubs 29 are rotatably coupled to turntables 27 and 28. The turntables 27 and 28 are mounted on shafts which are journaled in the tape deck 10 and coupled to the recorder driver mechanism (not shown). The cartridge 11 may be reversed by removing the cartridge, turning the cartridge 11 over and repositioning it on the tape deck 10.

The tape 14 is driven at slow speeds for recording and playback by a slow speed drive mechanism including a capstan 33 which cooperates with a pressure roller 34. The capstan 33 is supported by a U-shaped bracket 35 which is secured to the tape deck 10 and is rotatably mounted in journals 36 and 37. The journals 36 and 37 are secured by brackets 39 and 38, respectively. A pulley-like capstan flywheel 40 is secured on the capstan shaft 33 for accepting a belt-type driving force from a tape transport drive motor (not shown).

Figure 4:
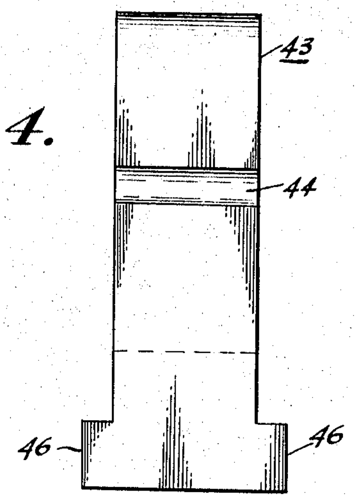
FIGURE 4 is a front view of a pressure roller spring of FIGURE 2.
Figure 5:
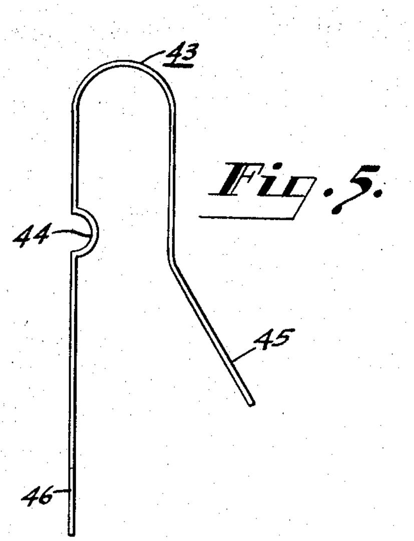
FIGURE 5 is a side view of the spring shown in FIGURE 4.
Figure 10:
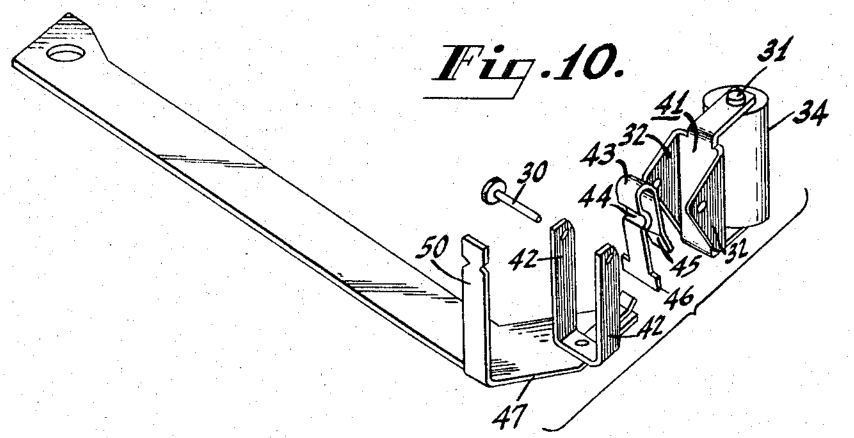
FIGURE 10 is an exploded perspective view of a portion of tape drive mechanism of FIGURES 1 and 2 embodying the invention.

The pressure roller 34 (FIGURES 1, 2 and 10) is carried by a vertical pin 31 which is rotatably mounted on a U-shaped bracket 41 having a pair of mounting legs 32 extending parallel to pin 31. The bracket mounting legs 32 are pivotally mounted on a horizontal pin 30 and carried by lugs 42 which extend from a pressure roller arm 47 allowing the pressure roller 34 to be pivoted in a plane parallel to the axis of rotation of capstan 33. As shown in the exploded view, FIGURE 10, a spring clip 43 inserted between the bracket 41 and the lugs 42 and is also pivoted on the pin 30. The spring clip 43 (FIGURES 4 and 5) is formed of a strip of material such as bronze or steel having its grain oriented substantially vertically when viewing the spring in the position as shown in FIGURE 4. The spring 43 has an overall general U-shape (FIGURE 5) formed with an arched recess 44 that serves as a socket for pivoting the spring clip 43 about the pin 30, and a divergent end portion 45 for urging against bracket 41. As viewed in FIGURE 4, the spring clip 43 has two horizontally extended tabs 46 at the bottom end. When the spring clip 43 is in place, the end portion 45 resiliently urges against bracket 41 while the tabs 46 abut against the bottom of lugs 42 causing the bracket 41 to tilt about pin 30 so that the axis of rotation of the pressure roller 34 is set at a predetermined angle (approximately 20°) divergent from the rotational axis of the capstan 33 (FIGURE 2).

The pressure roller arm 47 and another arm 48 control the forward movement of the pressure roller 34, both arms being secured to the tape deck 10 by a pivot 49. The arm 48 is L-shaped and is disposed in contact with another L-shaped arm 50 at the end thereof (see FIGURE 1). The latter arm 50 controls the movement of pressure head slide plate 21. Accordingly, when the pressure roller 34 is spaced from the capstan 33, as shown in FIGURES 1 and 2, the arm 48 positions the arm 50 to hold the pressure pad slide plate 21 so the pressure pads 17 and 18 are spaced away from the heads 12 and 13. In this position (FIGURES 1 and 2), cartridge 11 may be placed on the deck and the tape 14 may enter between the pressure pads and the heads and between the capstan and pressure roller. The tilted displacement of pressure roller 34 allows for a greater clearance gap between the pressure roller and capstan for acceptance of the tape 14. The pressure pads and the pressure roller are in this position also during rewind operation so as not to impede the rapid movement of the tape.

The arm 48 is biased in a direction away from the capstan by a spring 51 which is attached between a projection 52 on the arm 48 and to a stud 53 on the tape deck 10. Since the edge of the arm 48 engages an upstanding projection 54 on the arm 47 which carries the pressure roller 34, the pressure roller also moves over the bias of spring 51 to the position shown in FIGURES 1 and 2. The stud 53 acts as a stop for both arms 47 and 48. A spring 55 between the projection 52 and 54 on the arms 47 and 48 yieldably couples these arms together. Accordingly, when the arm 48 is moved towards the cartridge 11 as viewed in FIGURE 1, by the recorder control mechanism, the pressure roller 34 is yieldably urged against capstan 33. Since the pressure roller 34 is resiliently tilted and pivotally mounted for rotation about a pair of axis, one which is perpendicular and the other parallel to the axis of the capstan, the pressure roller aligns itself with respect to the capstan (FIGURES 8 and 9).

The control mechanism for the recorder is actuatable by a single control knob 70 (shown in phantom in FIGURE 2) and is secured to a control shaft 71 which is journaled for rotation in the tape deck 10 and supported on the tape deck 10 by means of a bracket 72. The bracket 72 is shown broken away in FIGURE 1 to illustrate other parts of the control mechanism. The bracket 72 carries a spring wire 73 which bears against a flat on the control shaft 71 and holds the shaft normally in its central position as viewed in FIGURE 1. The shaft may be rotated about 90° in a clockwise or in a counterclockwise direction to condition the apparatus for slow speed drive or for fast rewinding, respectively.

Figure 3:
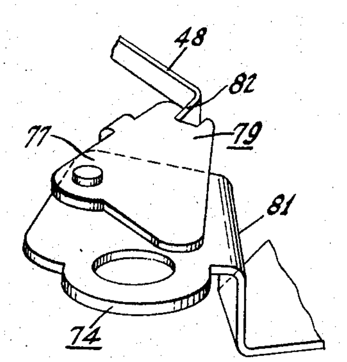
FIGURE 3 is an enlarged perspective view of another portion of the pressure roller-capstan drive mechanism shown in FIGURES 1 and 2.

A cam plate 74 is rotatable with the shaft 71 and includes a pivot 77. A toggle plate 79 is secured to the cam plate 74 at the pivot 77 and is biased in a clockwise direction by a spring 80 which is connected between the vertical wall 81 of the cam plate 74 and to a downwardly projection on the toggle plate 79. The toggle plate 79 has a notch therein that interlocks with a V-shaped notch in a tongue 82 on the arm 48 (FIGURES 2 and 3) providing a detent mechanism for maintaining the slow speed reeling mechanism in the tape driving relationship. When the control shaft 71 is turned in clockwise direction (slow speed drive) the toggle plate 79 pivots about its pivot 77, overcoming the bias of the spring 80 and pivots the arm 48 in a counterclockwise direction about its pivot 49. The pressure roller 34 is therefore advanced into engagement with the capstan 33. The pressure roller is maintained in contact with the capstan 33 by a toggle joint defined between the cam plate 74 and the toggle plate 79 at the pivot 77. The toggle joint moves from left to right, with the clockwise rotation of shaft 71, past its dead center portion and is maintained past its dead center position by the bias of the spring 80. A subsequent counterclockwise rotation of shaft 71 disengages the pressure roller 34 from capstan 33. When the shaft 71 is rotated counterclockwise from its center position for fast rewinding, the pressure roller 34 remains disengaged.

Figure 8:
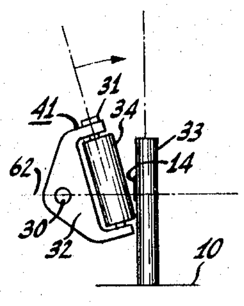
FIGURE 8 is an illustration of the interrelation of the pressure roller and capstan portion of the tape drive mechanism of FIGURES 1 and 2 at the time of initial engagement.
Figure 9:
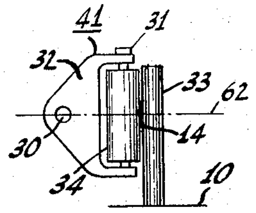
FIGURE 9 is another illustration of the interrelation of the pressure roller and capstan portion of the tape drive mechanism of FIGURES 1 and 2 under full engagement.

The spring clip 43 tilts the pressure roller 34 top away from the capstan 33 as viewed in FIGURES 2 and 8 (the tape load or playback position). Tilting the pressure roller 34 top away from the capstan 33 serves a dual purpose. First, the tilting provides a greater clearance for inserting the tape 14 between the capstan 33 and the pressure roller 34, as previously mentioned, and second, provides a means of aligning the tape 14 with the tape guides 25 and 24. The tape guides 24 and 25 are generally cylindrically shaped with the upper portions formed in the general tapered shape of a blunt cone. A rectangular guide slot 56 is cut into the blunt cone portion on the side facing the magnetic heads 12 and 13. The slot 56 has a generally vertical inner wall having a dimension slightly greater than the width of the recorded tape 14 with its lower lip 58 larger than its upper lip 57. The slot 56 captures the tape 14 and accurately guides the vertical positioning of the tape 14 with respect to the magnetic heads 12 and 13.

With a tape cartridge recorder as shown in FIGURE 1, for the easy convenience of the operator, the tape cartridge 11, and the tape guides 24 and 25 should be made to cooperate in such a manner so that the tape cartridge automatically positions itself and the tape 14 automatically tends to enter the tape guide slots 56 as the tape cartridge is positioned in the tape deck. The seating of tape 14 in the guide slots 56 is generally accomplished by making the center line 61 of the tape guides 59 in the tape cartridge 11, when in place on the tape recorder, 0.01 inch lower than the center line 62 of the tape guide slots 56 on the recorder tape guides 24 and 25 as illustrated by dimensions A—A of FIGURE 6. However, since the tape 14 is not always taut in the cartridge 11, it is possible for the tape 14 to drag on the recorder tape guides 24 and 25 as the cartridge is inserted in place. This results in a misalignment of the tape 14 with respect to the tape guide slots 56. If the tape 14 is not in the tape guide slots 56 at the time the pressure roller 34 engages the capstan 33, the tape 14 is pulled taut by the combined capstan and pressure roller driving force and may be mistracked across the pickup heads 12 and 13 as much as 0.02 inch. Since the record track is generally only .043 inch wide, this produces as much as 50% error in a height alignment.

Figure 6:
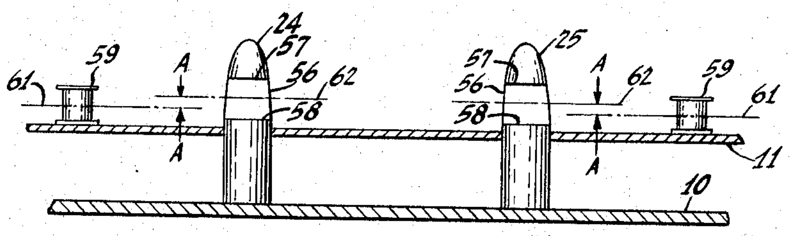
FIGURE 6 is a fragmentary front view of FIGURE 1 illustrating the relationship between the tape guides and the tape cartridge.
Figure 7:
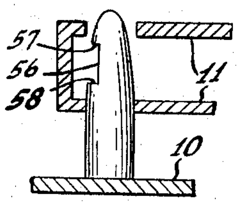
FIGURE 7 is a right side view of the tape guides of FIGURE 6.

The tape 14, however, is aligned positively by the application of a downward force on the tape by the pressure roller 34 as the pressure roller engages the capstan 33. As shown in FIGURES 8 and 9, as the pressure roller 34 assembly moves toward the capstan 33, the bottom edge of the roller first engages the capstan causing the pressure roller to tilt toward the capstan (as indicated by the arrow) against the resilient force of the spring clip 43. This aligning effect essentially produces a downward sliding movement on the engaging portion of the pressure roller 34 along the drive surface of the capstan 33. As the pressure roller assembly advances further toward the capstan, it captures the tape 14, even though misaligned (FIGURE 8), disposed between the capstan 33 and the pressure roller 34 transmitting the downward sliding motion to the tape 14 causing the tape 14 to slide along the drive surface of the capstan 33 down toward the center line 62 of the tape guide slots 56 (FIGURES 6, 8 and 9). As previously mentioned, the recorder guide slots 56 have a larger step 58 at the bottom of the guide slots than the top (FIGURE 7). The larger step 58 prevents the tape 14 from being forced beyond the tape guide by capturing the tape as the tape is forced downward. The smaller upper step 57 allows for easy removal of the tape 14 from the guide slots as the tape cartridge 11 is removed. Once the tape 14 is captured by the tape guide slots 56, the alignment has been completed and any further sliding motion of a portion of pressure roller 34 will produce no further downward motion on the tape.

The above described process automatically eliminates any misalignment in the tape 14 that may have occurred while inserting the tape cartridge 11 on the tape deck 10. Should the tape 14 seat itself in the guide slots 56 during the process of inserting the cartridge 11, the action of the pressure roller 34 has no affect upon the tape and the tape 14 remains captured by the guide slots 56. The tilted pressure roller 34 may be used and then also functions in the same manner to correct misalignment in an ordinary reel type tape recorder in which an operator threads the tape into the recorder drive and pickup mechanism.

What is claimed is:

1. In a tape tansport mechanism adapted to receive a pair of rotatable tape reeling devices with the tape being reelable between said devices including, a rotatable capstan, and a rotatable pressure roller, said capstan and pressure roller being disposed on opposite sides of said tape and being movable towards each other to engage and drive the tape therebetween, and away from each other to release the tape, the improvement comprising, a plurality of tape guides having slots cut therein for guiding the movement of said tape, and means for resiliently mounting the rotational axis of said pressure roller at an angle divergent from the rotational axis of said capstan; and means for urging said pressure roller into engagement with said capstan to provide a downward sliding motion of a portion of said pressure roller along said capstan that captures and forces said tape into said tape guide slots.

2. In a tape transport mechanism adapted to receive a pair of reelable devices between which a tape is adapted to travel including, a rotatable capstan mounted with its axis of rotation normal to a tape deck, and a rotatable pressure roller disposed on the opposite side of the tape than said capstan, said rotatable pressure roller being movably mounted for movement along said tape deck towards said capstan for engagement with said capstan and the tape therebetween, and away from said capstan to release the tape, wherein said capstan and said pressure roller cooperate to drive the tape between one of said reeling devices which supplies the tape and the other of said devices which takes up the tape, the improvement comprising:

a plurality of tape guides mounted normal to said tape deck, said tape guides having a generally cylindrical shape with a portion thereof formed in the general shape of a blunt cone, each of said tape guides being formed with a slot cut in said blunt cone portion for defining a path for said tape as said tape is driven between said reeling devices, and means for resiliently mounting the rotational axis of said pressure roller at an angle divergent from said rotational axis of said capstan, said mounting means providing a wider clearance between said pressure roller and said capstan at a point remote from said tape deck than a point nearer to said tape deck; and means for urging the portion of said pressure roller disposed nearer to said tape deck into engagement with said capstan to provide a downward sliding movement of said portion of the pressure roller engaging said capstan along said capstain toward said tape deck which captures the tape therebetween and forces the tape to slide along said capstan for insertion of said tape in said tape guide slots whereby said guide slots capture said tape and control the movement of said tape along said path.

3. In a tape transport mechanism adapted to receive a cartridge type tape record having a pair of reeling devices between which a tape is adapted to travel including, a plurality of tape guides for designating a path of travel for said tape, a rotatable capstan, and a rotatable pressure roller, said capstan and pressure roller being disposed on opposite sides of said path and being movable towards each other to engage and drive said tape therebetween, and away from each other to release said tape, the improvement comprising, means for resiliently mounting the rotational axis of said pressure roller to tilt said pressure roller away from said capstan at an angle divergent to the rotational axis of said capstan so that as said pressure roller and capstan engage, the portion of said pressure roller near said capstan slides downwardly along said capstan in the process of aligning said pressure roller with said capstan thereby capturing said tape and forcing said tape into said tape guides.

4. A tape recorder drive mechanism comprising:

a plurality of tape guides mounted normal to a tape deck, each of said tape guides having a slot cut therein for capturing and guiding a tape medium past the tape recorder pickup heads;

a rotatable capstan mounted normal to said tape deck and in close proximation to said tape guides, said rotatable capstan being coupled to a tape recorder drive motor;

an elastic cylindrically shaped pressure roller rotatably mounted on a shaft passing through the center of said pressure roller;

a first pivotal mounting means for mounting the pressure roller shaft for rotation of said pressure roller in a plane parallel to the axis rotation of said capstan;

a second pivotal mounting means for mounting said first pivotal mounting means on said tape deck for movement along the plane of said tape deck for engagement of said pressure roller with said capstan and a tape placed therebetween wherein said capstan and pressure roller cooperate to frictionally drive said tape, and resilient means urging against said first and second pivotal mounting means for resiliently tilting said pressure roller shaft at an angle divergent from the axis of rotation of said capstan when the pressure roller is not engaging said capstan thereby providing a greater clearance for accepting a tape between said pressure roller and said capstan, said pressure roller providing a downward force on a tape dispaced between said pressure roller and said capstan when said pressure roller engages and aligns itself with said capstan thereby forcing the tape to slide along said capstan and into said tape guide slots.

5. A tape drive mechanism for a cartridge type tape transport comprising:

a plurality of tape guides disposed in close proximation to a record pickup head for accurate positioning of a cartridge type tape record on a tape deck, said plurality of tape guides being formed with slots for defining a path of travel for the tape with relation to said pickup head;

a rotatable capstan mounted on said tape deck coupled to a tape drive motor and having its rotation axis normal to said path of travel of said tape;

a pressure roller mounted for rotation about a shaft passing through its axis of rotation, a first mounting means for pivotally mounting said pressure roller shaft for rotation in a plane generally parallel to said axis of rotation of said capstan;

a second pivotal mounting means mounting said first mounting means to said tape deck, adjacent to and on the opposite side of said tape than said capstan when said cartridge is positioned on said tape deck, for movement along said tape deck for engagement of said pressure roller with said capstan and said tape disposed therebetween;

a first resilient means for pivoting said second mounting means for engagement of said pressure roller with said capstan and tape therebetween, said resilient means providing sufficient force so that said pressure roller and capstan cooperate to frictionally drive said tape;

a second resilient means for urging against both first and second mounting means for resiliently tilting said first mounting means so that the pressure roller shaft is displaced at a predetermined angle divergent from said axis of rotation of said capstan and providing a wider clearance between the end of said capstan and said pressure roller for insertion of a portion of said cartridge tape record therebetween, said second resilient means providing a sliding motion along the axis of rotation of said capstan for a portion of said pressure roller that engages said capstan and said tape disposed therebetween while said pressure roller aligns with said capstan under the resilient force of said first resilient means thereby forcing said tape along said capstan until said tape is captured by said tape guide slots.

6. In a tape recorder drive mechanism including a plurality of guide slots, and a rotatably mounted capstan and a rotatable pressure roller disposed on opposite sides of a tape inserted therebetween, said capstan and pressure roller being adapted to engage each other and tape therebetween to drive said tape, the improvement comprising, spring means for tilting the rotational axis of said pressure roller at a predetermined angle away from the rotational axis of said capstan when said pressure roller and said capstan are not engaged providing a wider gap between said pressure roller and said capstan at a point remote from the mounting of said capstan than a point nearer said capstan mounting; and means for urging the portion of said pressure roller disposed nearer to said capstan mounting into engagement with said capstan to provide a downward sliding movement of said pressure roller while said pressure roller aligns itself with said capstan to drive said tape.

7. Winding and reeling apparatus for transporting a flexible tape from a storage reel to a takeup reel, said apparatus comprising:

a transport mechanism, including a capstan having an axis of rotation, for moving said tape between said reels;

a pressure roller, likewise having an axis of rotation, maintained in a rest position adjacent said capstan during quiescent intervals but movable to an operating position to effect transport of said tape by said capstan;

first aligning means for displacing said axis of said roller in a plane parallel to said axis of said capstan to establish a co-planar relation of their axes;

resilient means for tilting said axis of said roller in said plane parallel to said axis of said capstan at a predetermined angle divergent from the axis of said capstan, and self-alignment means for displacing said axis of said roller, against the force of said resilient means, in the plane of said axis of said capstan to establish a parallel relation of said axes in their common plane when said roller is in its aforesaid operation position.

8. Winding and reeling apparatus for transporting a flexible tape from a storage reel to a takeup reel, said apparatus comprising:

transport mechanism, including a capstan having an axis of rotation, for moving said tape between said reels;

a pressure roller, likewise having an axis of rotation, maintained in a rest position adjacent said capstan during quiescent intervals but movable to an operating position to effect transport of said tape by said capstan;

mounting means for supporting said roller;

adjusting means for varying the position of said mounting means to place said axis of said roller in a plane parallel to said axis of said capstan to establish a co-planar relation of their axes, and swivel means including a spring coupling said roller to said mounting means for displacing said axis of said roller in said plane parallel to the axis of said capstan at a predetermined angle divergent from said axis of said capstan, and for automatically establishing said axis of said roller in the plane of said axis of said capstan to establish a parallel relation of said axes in their common plane when said roller is in its adjacent operation position.

References Cited by the Examiner

UNITED STATES PATENTS

| | | | |
|---|---|---|---|
| 3,096,920 | 7/1963 | Schober | 226—180 |
| 3,113,708 | 12/1963 | Monlic | 242—55.19 |
| 3,127,178 | 3/1964 | Osborne | 242—55.13 |
| 3,164,331 | 1/1965 | Hardy | 226—176 X |

M. HENSON WOOD, Jr., *Primary Examiner.*

C. H. SPADERNA, *Assistant Examiner.*